United States Patent Office 2,710,505
Patented June 14, 1955

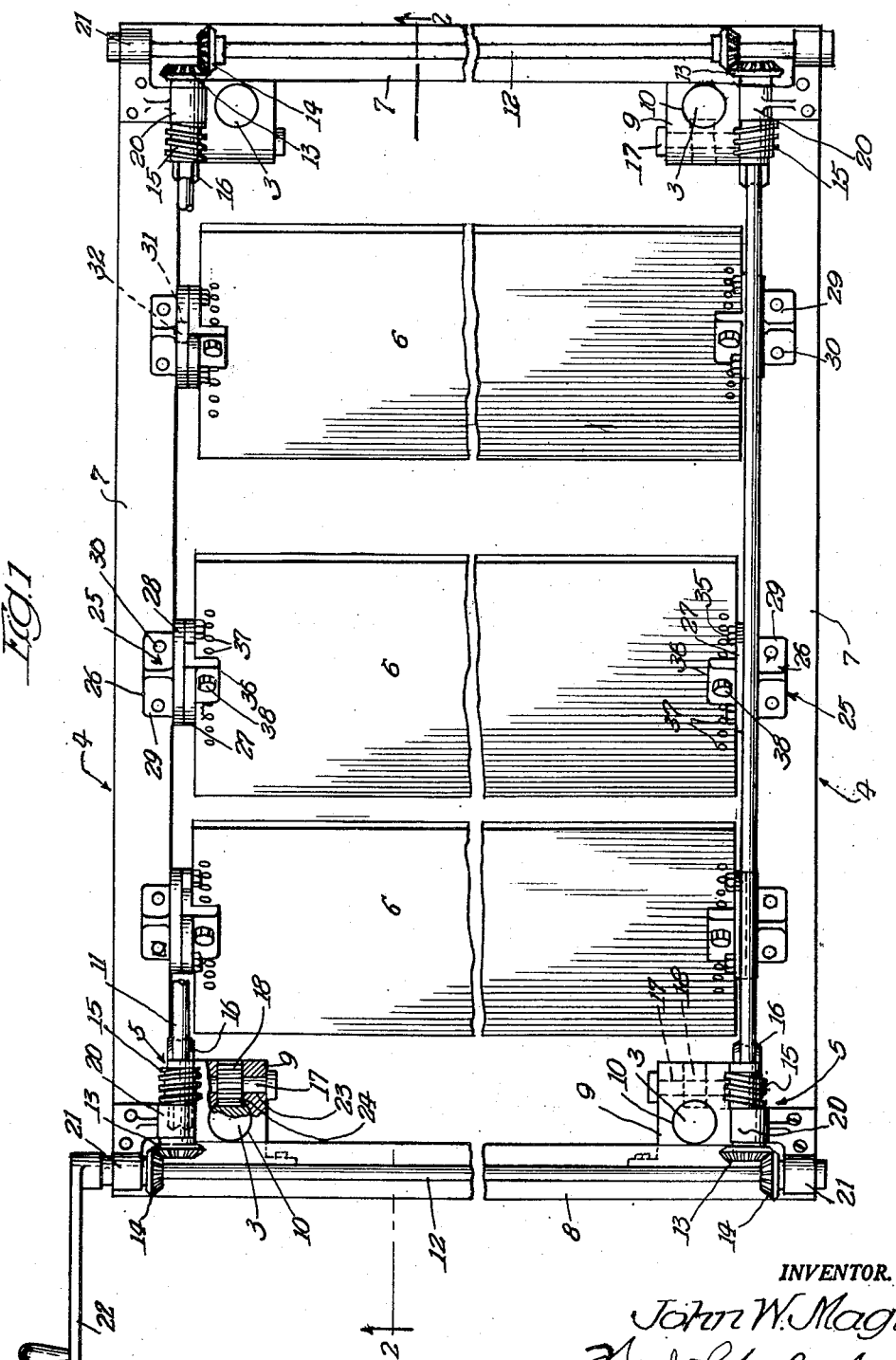

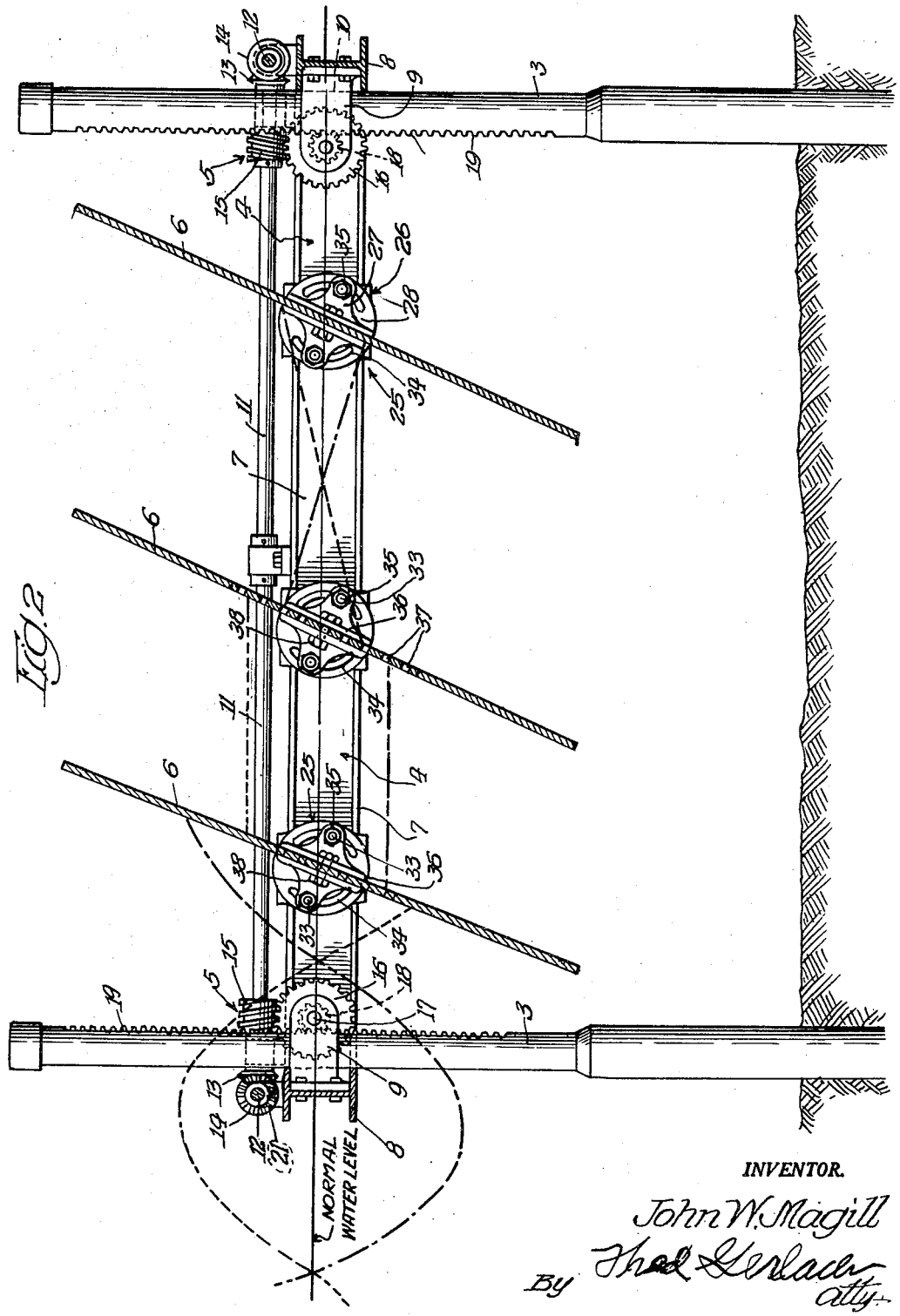

2,710,505

BAFFLE PLATE TYPE BREAKWATER UNIT FOR EFFECTING WAVE ENERGY DISSIPATION

John W. Magill, Chicago, Ill.

Application August 21, 1951, Serial No. 242,914

7 Claims. (Cl. 61—4)

The present invention relates generally to breakwater structures. More particularly the invention relates to that type of breakwater structure which is positioned in an open body of water at a location a comparatively small distance outwards of the adjacent shore line, forms a boat or ship harbor between it and such part of the shore line and serves to effect wave energy dissipation to the end that the water in the harbor is maintained in a substantially quiescent state regardless of the intensity or magnitude of the waves that are outwards of the structure and impinge thereagainst.

One object of the invention is to provide a breakwater unit which forms together with a group of like adjoining units a breakwater structure of the aforementioned type, is longer lasting and less costly than a conventional solid breakwater structure, and comprises a series of upstanding laterally spaced baffle plates which are disposed in substantially parallel relation with the adjacent shore line, are substantially as high as the maximum waves that are encountered, are positioned so that the medial or central portions thereof are located at normal water level, and coact to effect the desired wave energy dissipation.

Another object of the invention is to provide a breakwater unit of the last mentioned character in which the baffle plates are at least three in number and the third from the outermost baffle plate is spaced inwards with respect to the next or intermediate baffle plate a distance greater than the last mentioned baffle plate is spaced from the outermost baffle plate in order to obtain maximum efficiency so far as wave energy dissipation is concerned.

Another object of the invention is to provide a breakwater unit of the type and character under consideration in which each of the upstanding baffle plates is provided with mounting means therefor whereby it may be slid upwards and downward and also tilted angularly fore and aft relatively to the other baffle plates.

Another object of the invention is to provide a breakwater unit of the character heretofore mentioned in which the baffle plates together with their individual mounting means are carried by a horizontal frame which is supported so that it may be raised or lowered in order properly to position the baffle plates with respect to the level of the body of water in which the unit as a whole is positioned.

A further object of the invention is to provide a breakwater unit of the last mentioned character in which the horizontal frame is supported by way of posts and has gearing between it and the posts whereby it may be raised or lowered in order to position the baffle plates at the proper elevation with respect to the normal level of the water.

A still further object of the invention is to provide a breakwater unit which is generally of new and improved construction and effectively and efficiently fulfills its intended purpose.

Other objects of the invention and the various advantages and characteristics of the present breakwater unit will be apparent from a consideration of the following detailed description.

The invention consists in the several novel features which are hereinafter set forth and are more particularly defined by the claims at the conclusion hereof.

In the drawings which accompany and form a part of this specification or disclosure and in which like numerals of reference denote corresponding parts throughout the several views:

Figure 1 is a plan view of a breakwater unit embodying the invention; and

Figure 2 is a vertical section taken on the line 2—2 of Figure 1 and illustrating in detail the arrangement and manner of mounting of the baffle plates and the design and manner of supporting the horizontal frame which carries the baffle plates and the latter's individual mounting means.

The breakwater unit which is illustrated in the drawings constitutes the preferred embodiment of the invention. It is designed and adapted to be positioned in an open body of water at a location a comparatively small distance outwards of the adjacent shore line and serves together with a group of like adjoining units (not shown) to form a breakwater structure and a boat or ship harbor between the structure and the adjacent shore line. The purpose of the unit is to effect wave energy dissipation to such an extent that the water in the harbor is maintained in a quiescent state regardless of the intensity or magnitude of the waves that are outwards of the breakwater structure as a whole and impinge or strike thereagainst. As its principal components or parts the unit comprises a set of posts 3, a horizontal frame 4, gearing 5 between the frame and the posts, and a series of upstanding laterally spaced baffle plates 6 within the frame.

The posts 3 of the unit are preferably four in number and extend vertically. They form with the frame 4 a normally stationary supporting structure for the baffle plates 6 and are arranged in a rectangular pattern. The lower ends of the posts are suitably and fixedly mounted within holes in the bottom under the body of water in which the unit is positioned. As shown in Figure 2 of the drawings, the height of the posts is such that the upper portions of the posts project an appreciable distance above the normal level of the body of water. If desired, the posts may be formed of stainless steel, bronze or any other suitable material which is not subjected to oxidation or corrosion by sea or fresh water. Preferably the posts are of circular cross section and have thickened lower end portions.

The horizontal frame 4 is rectangular and matches the rectangular pattern of the posts 3. It is of unitary design or construction and consists of a pair of parallel spaced apart outer members 7 and a pair of parallel spaced apart side members 8. These members are preferably in the form of I-beams and are arranged so that the webs thereof extend vertically (see Figure 2). The end members 7 of the frame extend at right angles to the side members 8 and have the ends thereof fixedly connected to the ends of the side members. In addition to the end and side members the frame 4 comprises four slide blocks 9. These blocks fit within the corners of the frame and are bolted or otherwise fixedly secured to the connected ends of the end members 7 and the side members 8. The central portions of the slide blocks are provided with vertically extending open-ended bores 10. The upper ends of the posts 3 extend loosely through these bores in order that the frame 4 may be slid upwards or downwards relatively to the posts. The posts 3 are arranged so that the side members 8 of the frame are disposed in substantially parallel relation with the adjacent shore line. It is contemplated that the frame will be positioned at the normal level of the body of water in which the unit is located. It is also contemplated that if the level of the body of water should raise or lower, the frame will be raised or lowered correspondingly.

The gearing 5 of the unit serves as a medium or instrumentality for raising or lowering the frame with respect to the posts and is mounted for the most part on the frame. It comprises a pair of horizontally extending parallel laterally spaced shafts 11, a pair of horizontally extending parallel laterally spaced shafts 12, bevel gears 13 on the ends of the shafts 11, bevel gears 14 on the ends of the shafts 12, worms 15 on the shafts 11, worm gears 16, stub shafts 17, pinions 18 and vertically extending racks 19 on the central and upper end portions of the posts 3. The shafts 11 overlie and extend lengthwise of the end members 7 of the horizontal frame 4 and have the end portions thereof journaled in bearings 20 on the ends of the end members 7. The shafts 12 overlie and extend lengthwise of the side members 8 of the frame 4 and have their end extremities journaled in bearings 21 at the ends of the side members 8. The bevel gears 13 are keyed or otherwise fixedly secured to the end extremities of the shafts 11 and are disposed directly outwards of the bearings 20. The bevel gears 14 are keyed or otherwise fixedly secured to the ends of the shafts 12. They are disposed inwards of the bearings 21 and are in mesh with the bevel gears 13. As shown in Figure 1, the bevel gears 14 on the outermost shaft 12 are positioned oppositely to the bevel gears on the innermost shaft 12. Because of this the shafts 11 and 12 are so geared together that when one shaft is driven the other three shafts are driven conjointly therewith. A crank 22 is connected to one end of the shafts and serves together with the bevel gears as a medium for effecting conjoint turning of the four shafts. If desired, the crank may be replaced by any other suitable turning means such, for example, as an electric motor and speed-reducing gearing (both not shown). The arrangement of the bevel gears 13 and 14 is such that turning of the crank in either direction results in turning of the shafts 11 in opposite directions. In other words, when the crank 22 is turned in one direction one of the shafts 11 will turn in a clockwise direction and the other shaft 11 will turn or rotate in a counter-clockwise direction. The worms 15 of the gearing 5 are keyed or otherwise fixedly secured to the shafts 11. They are disposed directly inwards of the bearings 20 and mesh with and serve to drive the worm gears 16 which, as shown in the drawings, are located beneath the worms and are connected to the outer ends of the stub shafts 17. The latter extend horizontally and are disposed at right angles to the end members 7 of the frame 4 and the shafts 11. They are journaled in horizontal bores 23 in the inner portions of the slide blocks 9. The pinions 18 are suitably fixedly secured to the central portions of the stub shafts 17. They are located in cut-outs 24 in the inner portions of the slide blocks 9 and mesh with the racks 19 on the central and upper end portions of the posts 3. The worms and worm gears are so arranged and designed that when the crank 22 is turned in one direction they operate through the medium of the stub shafts 17 so to turn the pinions 18 as to cause the frame 7 to raise and when the crank is turned in the opposite direction they operate through the medium of the stub shafts so to turn the pinions as to effect lowering of the frame. The gearing 5 because it includes the worms 15 and the worm gears 16 is irreversible insofar as the frame 7 may only be raised or lowered by turning of the crank 22. When it is desired to raise the frame the crank is turned in one direction and when it is desired to lower the frame the crank is turned in the opposite direction, as heretofore indicated.

The series of upstanding laterally spaced baffle plates 6 is located within and carried by the rectangular frame 4 of the unit and effects the desired wave energy dissipation. Preferably there are three baffle plates, as shown in the drawings. It is contemplated, however, that there may be more, but no less than three baffle plates. The plates extend lengthwise of the side members 8 of the frame and are substantially as high as the maximum waves that are encountered. They have individual mounting means 25 between their end margins and the end members 7 of the horizontal frame 4 and are normally positioned so that the medial or central portions thereof are located at the normal level of the body of water in which the unit is positioned. When there are no waves outwards of the baffle plates the lower portions of the plates are immersed in the water and the upper portions of the plates project above the water. When waves occur outwards of the unit a wave will strike against and ride upwards on the outer face of the outermost baffle plate. It will then recede after being baffled by the outermost baffle plate, and then in a greatly diminished condition or form pass under the lower edge of the outermost baffle plate and encounter the intermediate baffle plate. The portion of the remaining wave that flows under the edge of the outermost baffle plate has a tendency to flow upwards to a limited extent between the intermediate baffle plate and the outermost baffle plate. When such portion recedes in response to the action of the next following wave on the outermost baffle plate it passes under the lower edge of the intermediate baffle plate and encounters the third or innermost baffle plate. The latter effects such a baffling action that the body of water that is inwards of the unit is in a substantially quiescent state. The portion of the water that is between the intermediate baffle plate and the outermost baffle plate moves upwards and downwards between the two plates with a pumping or pulsating action which when the waves are comparatively high is out of phase with the waves striking against the outermost baffle plate. This pumping or pulsating action has a marked tendency to produce between and beneath the intermediate baffle plate and the outermost baffle plate a barrier zone of water which, in connection with the action of the outermost baffle plate effectively and efficiently breaks up the wave formations prior to passage of the moving water under the lower edge of the intermediate baffle plate into the space between the innermost baffle plate and the intermediate baffle plate. In practice it has been found that from the standpoint of wave energy dissipation best results are obtained when the innermost baffle plate is spaced from the intermediate baffle plate a distance greater than the distance between the intermediate and the outermost baffle plates. It has also been found that in certain instances, depending upon the type of water and the particular characteristics of the wave formations optimum results are obtained by varying the height and angularity of any one of the baffle plates with respect to the other plates and accordingly the individual mounting means 25 between the end margins and the baffle plates and the end members 7 of the frame are so designed and constructed that each of the baffle plates may be slid upwards and downwards and also tilted angularly fore and aft to a limited extent relatively to the other baffle plates.

The upstanding baffle plates 6 are each provided with two mounting means 25. As shown in the drawings, each mounting means comprises an outer bracket member 26 and an inner bracket member 27. The outer bracket members 26 are C-shaped and consist of vertically extending intermediate parts 28 and horizontal outwardly extending end parts 29. They are arranged in straddled relation with the end members 7 of the horizontal frame 4 and are fixedly secured to such members by way of vertically extending bolts 30 which extend through aligned holes in the horizontal outwardly extending end parts 29 and the inner side portions of the top and bottom flanges of the frame end members 7. The intermediate parts 28 of the outer bracket members 26 are provided in the central portions thereof with cylindrical sockets 31. The inner bracket members 27 fit against the intermediate parts 28 on the outer bracket members 28 and are provided on the central portions thereof with outwardly extending trunnions 32 which fit rotatably in the sockets 31 in the central portions of the intermediate parts 28 of the outer bracket members 26 and form with such sockets pivotal connections whereby the inner bracket members 27 are permitted to turn about horizontal axes relatively to the outer bracket members. Horizontally extending nut-equipped studs 33 serve releasably to lock the inner bracket members 26 against turning relatively to the outer bracket members 26. The central portions of these studs extend through arcuate slots 34 in the inner bracket members 27 and the ends of the studs that extend in the direction of the end members 7 of the frame 4 fit within screw threaded holes in the intermediate parts 28 of the outer bracket members 26. The nuts are designated in the drawings by the reference numeral 35 and are mounted on the opposite ends of the studs. They bear against the slot-defining portions of the inner bracket members 27 and serve when tightened to clamp the inner bracket members in locked or fixed relation with the outer bracket members 26. The arcuate slots 34 are arranged in concentric relation with the trunnions 32. When the nuts 35 are loosened the inner bracket members 27 may be turned relatively to the outer bracket members 26. The inner bracket members are provided with parallel spaced apart pairs of inwardly extending lugs 36 and these straddle and receive slidably the central portions of the end margins of the baffle plates 6 so as to permit the baffle plates to be slid upwards or downwards relatively to the inner bracket members 27. The central portions of the end margins of the baffle plates 6 are provided with longitudinally extending series of holes 37 and these coact with bolts 38 to form means for releasably securing the baffle plates in the various positions into which they are slid. The bolts 38 extend through holes in the lugs 36 and the holes 37 that are in alignment therewith. When it is desired to adjust one of the baffle plates upwards or downwards with respect to the other baffle plates, the bolts 38 for the one baffle plate are removed and the one baffle plate is then slid upwards or downwards into the desired position. After the one baffle plate is adjusted properly, the bolts are then inserted into place. The inner and outer bracket members 26 and 27 together with the parts that are associated therewith form simple means whereby the baffle plates are mounted so that they may be slid upwards and downwards and also tilted angularly fore and aft relatively to one another. As heretofore pointed out, the unit is adapted with a group of like adjoining units to form a breakwater structure whereby the body of water between the structure and the adjacent portion of the shore line is maintained in a quiescent state regardless of the intensity or magnitude of the waves that are outwards of the structure and impinge or strike against the latter. Also as heretofore pointed out, it is contemplated that the frame 4 of the unit will be positioned at the normal level of the body of water in which the unit is positioned or located. Should the level of the body of water rise or fall because of tide or other conditions the frame of the unit is raised or lowered to the proper extent by turning the crank 22, as hereinbefore pointed out.

The herein described breakwater unit is essentially simple in design and, hence, may be produced at a comparatively low cost. It is characterized by high efficiency so far as wave energy dissipation is concerned and may be utilized not only as a harbor-forming medium but also as a means or instrumentality for preventing beach erosion.

The invention is not to be understood as restricted to the details set forth since these may be modified within the scope of the appended claims without departing from the spirit and scope of the invention.

Having thus described my invention what I claim as new and desire to secure by Letters Patent is:

1. A unit adapted to be positioned in an open body of water at a location outwards of the adjacent portion of the shore line and to form with adjoining like units a breakwater structure, and comprising a stationary supporting structure in the form of a plurality of vertically extending spaced apart members adapted to have the lower ends thereof fixedly anchored to the bottom under the water at said location and having such height that their upper ends are disposed adjacent the normal level of the body of water, and a horizontal frame connected to the upper ends of the members so that it is normally positioned adjacent said normal level of the body of water; and a horizontal series of no less than three upstanding laterally spaced baffle plate mounted within the frame so that they are normally stationary and extend in substantially parallel relation with said adjacent portion of the shore line, having a height substantially equal to that of the maximum waves that occur outwards of the unit, positioned so that when the frame is in its normal position their medial portions are disposed at substantially the normal level of the body of water, and adapted to effect energy dissipation of the waves that are outwards thereof and impinge thereagainst.

2. A unit adapted to be positioned in an open body of water at a location outwards of the adjacent portion of the shore line and to form with adjoining like units a breakwater structure, and comprising a stationary supporting structure in the form of a plurality of vertically extending spaced apart members adapted to have the lower ends thereof fixedly anchored to the bottom under the water at said location and having such height that their upper ends are disposed adjacent the normal level of the body of water, and a horizontal frame connected to the upper ends of the members so that it is normally positioned adjacent said normal level of the body of water; and a horizontal series of three upstanding laterally spaced baffle plates mounted within the frame so that they are normally stationary and extend in substantially parallel relation with said adjacent portion of the shore line, having a height substantially equal to that of the maximum waves that occur outwards of the unit, positioned with respect to the frame so that they are inclined upwards in the direction of said adjacent portion of the shore line and at a comparatively small acute angle with respect to the vertical and their medial portions are disposed at substantially the normal level of the body of water, arranged so that the innermost plate is spaced farther from the intermediate plate than the latter is spaced from the outermost plate, and adapted to effect energy dissipation of the waves that are outwards thereof and impinge thereagainst.

3. A unit adapted to be positioned in an open body of water at a location outwards of the adjacent portion of the shore line and to form with adjoining like units a breakwater structure, and comprising a stationary supporting structure in the form of a plurality of vertically extending spaced apart members adapted to have the lower ends thereof fixedly anchored to the bottom under the water at said location and having such height that their upper ends are disposed adjacent the normal level of the body of water, and a horizontal frame connected to the upper ends of the members so that it is normally positioned adjacent said normal level of the body of water; and a horizontal series of upstanding laterally spaced baffle plates mounted within the frame so that they are disposed in substantially parallel relation with said adjacent portion of the shore line, having a height substantially equal to that of the maximum waves that occur outwards of the unit, positioned with respect to the frame so that their medial portions are disposed at substantially the normal level of the body of water, adapted to effect energy dissipation of the waves that are outwards thereof and impinge thereagainst, and having individual mounting means between them and said frame whereby any one of them may be tilted angularly fore and aft to a limited extent relatively to the others and then rigidly secured in place.

4. A unit adapted to be positioned in an open body of water at a location outwards of the adjacent portion of the shore line and to form with adjoining like units a breakwater structure, and comprising a stationary supporting structure in the form of a plurality of vertically extending spaced apart members adapted to have the lower ends thereof fixedly anchored to the bottom under the water at said location and having such height that their upper ends are disposed adjacent the normal level of the body of water, and a horizontal frame connected to the upper ends of the members so that it is normally positioned adjacent said normal level of the body of water; and a horizontal series of three upstanding laterally spaced baffle plates mounted within the frame so that they are disposed in substantially parallel relation with said adjacent portion of the shore line, having a height substantially equal to that of the maximum of waves that occur outwards of the unit, positioned with respect to the frame so that their medial portions are disposed at substantially the normal level of the body of water, arranged so that the innermost plate is spaced farther from the intermediate plate than the latter is spaced from the outermost plate, adapted to effect energy dissipation of the waves that are outwards thereof and impinge thereagainst, and having individual mounting means between them and said frame whereby any one of them may be raised or lowered and tilted angularly fore and aft to a limited extent relatively to the others and then rigidly secured in place.

5. A unit adapted to be positioned in an open body of water at a location outwards of the adjacent portion of the shore line and to form with adjoining like units a breakwater structure, and comprising a plurality of vertically extending spaced apart posts adapted to have the lower ends thereof fixedly anchored to the bottom under the water at said location and having such height that their upper ends project above the normal level of the body of water, a horizontal frame mounted on the posts so that it is bodily adjustable upwards and downwards, and adapted normally to be positioned adjacent the normal level of the body of water, and a horizontal series of upstanding laterally spaced baffle plates mounted within the frame so that they are normally stationary and extend in substantially parallel relation with said adjacent portion of the shore line, having a height substantially equal to that of the maximum waves that occur outwards of the unit, arranged so that when the frame is in its normal position their medial portions are disposed at substantially said normal level of the body of water, and adapted to effect energy dissipation of the waves that are outwards thereof and impinge thereagainst.

6. A unit adapted to be positioned in an open body of water at a location outwards of the adjacent portion of the shore line and to form with the adjoining like units a breakwater structure, and comprising a plurality of vertically extending spaced apart posts adapted to have the lower ends thereof fixedly anchored to the bottom under the water at said location and having such height that their upper ends project above the normal level of the body of water, a horizontal frame mounted on the posts for adjustment bodily upwards and downwards and adapted normally to be positioned adjacent the normal level of the body of water, and a horizontal series of upstanding laterally spaced baffle plates disposed within the frame so that they are in substantially parallel relation with said adjacent portion of the shore line, arranged so that when the frame is in its normal position their medial portions are positioned at substantially said normal level of the body of water, adapted to effect energy dissipation of the waves that are outwards thereof and impinge thereagainst, and having individual mounting means between them and the frame whereby any one of them may be raised or lowered and tilted angularly fore and aft to a limited extent relatively to the others and then rigidly secured in place.

7. A unit adapted to be positioned in an open body of water at a location outwards of the adjacent portion of the shore line and to form with adjoining like units a breakwater structure, and comprising a plurality of vertically extending spaced apart posts adapted to have the lower ends thereof fixedly anchored to the bottom under the water at said location and having such height that their upper ends project above the normal level of the body of water, a horizontal frame mounted on the posts to slide upwards and downwards, adapted normally to be positioned adjacent the normal level of the body of water, and provided with gearing between it and said posts for sliding it upwards and downwards into different adjusted positions with respect to said posts, a horizontal series of three upstanding laterally spaced baffle plates disposed within the frame so that they are in substantially parallel relation with said adjacent portion of the shore line, having a height substantially equal to that of the maximum waves that occur outward of the unit, arranged so that when the frame is in its normal position their medial portions are positioned at substantially the normal level of the body of water and also arranged so that the innermost plate is spaced from the intermediate plate a distance greater than such intermediate plate is spaced from the outermost plate, adapted to effect energy dissipation of the waves that are outwards thereof and impinge thereagainst, and having individual mounting means between them and the frame whereby any one of them may be raised or lowered and tilted angularly fore and aft to a limited extent relatively to the others and then rigidly secured in place.

References Cited in the file of this patent

UNITED STATES PATENTS

| | | |
|---|---|---|
| 278,975 | Koon | June 5, 1883 |
| 1,557,787 | Taylor | Oct. 20, 1925 |
| 1,801,089 | King | Apr. 14, 1931 |

FOREIGN PATENTS

| | | |
|---|---|---|
| 941 | Great Britain | 1854 |
| 1,203 | Great Britain | 1860 |